US010982531B2

(12) United States Patent
Dai et al.

(10) Patent No.: US 10,982,531 B2
(45) Date of Patent: Apr. 20, 2021

(54) ASSESSING EXPANDABLE SAND SCREENS USING ELECTROMAGNETIC TOOL

(71) Applicant: Halliburton Energy Services, Inc., Houston, TX (US)

(72) Inventors: Junwen Dai, Singapore (SG); Ahmed Elsayed Fouda, Spring, TX (US); Ilker R. Capoglu, Houston, TX (US); Sushovon Singha Roy, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 103 days.

(21) Appl. No.: 16/427,136

(22) Filed: May 30, 2019

(65) Prior Publication Data
US 2019/0390544 A1     Dec. 26, 2019

Related U.S. Application Data
(60) Provisional application No. 62/688,219, filed on Jun. 21, 2018.

(51) Int. Cl.
| | | |
|---|---|---|
| *E21B 47/092* | (2012.01) | |
| *E21B 43/10* | (2006.01) | |
| *G01V 3/30* | (2006.01) | |
| *E21B 43/08* | (2006.01) | |

(52) U.S. Cl.
CPC ............ *E21B 47/092* (2020.05); *E21B 43/08* (2013.01); *E21B 43/108* (2013.01); *G01V 3/30* (2013.01)

(58) Field of Classification Search
CPC ............................ E21B 43/108; E21B 47/092
See application file for complete search history.

(56) References Cited

U.S. PATENT DOCUMENTS

| | | | |
|---|---|---|---|
| 4,744,030 A | 5/1988 | Carlson et al. | |
| 9,624,766 B2 * | 4/2017 | Draper | .................. E21B 47/113 |
| 9,715,034 B2 | 7/2017 | Omeragic et al. | |

(Continued)

FOREIGN PATENT DOCUMENTS

| | | |
|---|---|---|
| EP | 2378058 | 10/2011 |
| WO | 2019032262 | 2/2019 |

(Continued)

OTHER PUBLICATIONS

International Search Report for Application No. PCT/US2019/034762 dated Sep. 24, 2019.
Application No. PCT/US2018/039304 dated Jun. 25, 2018.

*Primary Examiner* — Shane Bomar
(74) *Attorney, Agent, or Firm* — John Wustenberg; C. Tumey Law Group PLLC (57) ABSTRACT

A method for determining the activation of an expandable sand screen may comprise disposing an electromagnetic (EM) detection tool into a wellbore. The EM detection tool may comprise at least one transmitter and at least one receiver. The method may further comprise transmitting an EM field from the one or more transmitters into the expandable sand screen to energize the expandable sand screen and form an eddy current, recording a voltage of the eddy current with the at least one receiver, and determining an activation state of the expandable sand screen based at least partially on the voltage of the eddy current.

20 Claims, 9 Drawing Sheets

(56) References Cited

U.S. PATENT DOCUMENTS

| | | | |
|---|---|---|---|
| 2004/0065446 A1* | 4/2004 | Tran | E21B 47/12 |
| | | | 166/384 |
| 2004/0100256 A1* | 5/2004 | Fickert | G01N 27/902 |
| | | | 324/221 |
| 2005/0274513 A1 | 12/2005 | Schultz et al. | |
| 2013/0220644 A1* | 8/2013 | Fripp | E21B 43/103 |
| | | | 166/387 |
| 2015/0338541 A1 | 11/2015 | Nichols et al. | |
| 2015/0354344 A1 | 12/2015 | Draper et al. | |
| 2016/0326840 A1 | 11/2016 | Bruce et al. | |
| 2017/0254194 A1* | 9/2017 | Mazyar | E21B 33/12 |
| 2018/0106141 A1 | 4/2018 | Fouda et al. | |
| 2020/0040712 A1* | 2/2020 | Malbrel | E21B 47/08 |

FOREIGN PATENT DOCUMENTS

| | | |
|---|---|---|
| WO | 2019094225 | 5/2019 |
| WO | 2020005194 | 1/2020 |

\* cited by examiner

ASSESSING EXPANDABLE SAND SCREENS USING ELECTROMAGNETIC TOOL

BACKGROUND

In subterranean wellbore drilling operations, fine particulate materials may be produced during the production of hydrocarbons from a wellbore, which may be an unconsolidated and/or loosely consolidated formation. Numerous problems may occur as a result of the production of such particulates. For example, the particulates cause abrasive wear to components within the wellbore, such as tubing, pumps and valves. In addition, the particulates may partially or fully clog the wellbore. Also, if the particulate matter is produced to the surface, it must be removed from the hydrocarbon fluids using surface processing equipment.

One method for preventing the production of such particulate material to the surface is gravel packing the wellbore adjacent to the unconsolidated and/or loosely consolidated production interval. In a gravel packing operation, a gravel packing system may be lowered into the wellbore on a conveyance to a position proximate the desired production area. A fluid slurry including a carrier fluid and a particulate material, which is typically sized and graded and which may be referred to as gravel in the disclosure, is then pumped down the conveyance and into the annulus of the wellbore, formed between the gravel packing system and the perforated wellbore casing or open hole production zone.

One such system and method for gravel packing is utilizing an expandable sand screen. During operations, an expandable sand screen may be disposed into a wellbore in a non-activated state. Once it reaches the desired depth, an activation chamber is expanded to comply with the sandface, which may expand the outer dimension of the sand screen as it is pushed away from the pipe string in an activated state. Over time, determining is a change has occur to the expandable sand screen may be important to downhole operations. Utilizing electromagnetic (EM) eddy current (EC) techniques may be a method and system for determining if an expandable sand screen is active or non-activated. During operations, a received signal from ED techniques may be proportional to the amount of metal that is around the transmitter and the receiver of an EM detection tool. For example, less signal magnitude is typically an indication of more metal, while more signal magnitude is an indication of less metal. This may allow one to use this relationship to make measurements of the amount of metal loss. Azimuthal eddy current flow has different intensity and flow path before and after expansion, due to the change in the cross section of the expandable sand screen. The received signal is thus related to the metal profile, indicating activation or non-activation of expandable sand screen.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to methods for identifying activation status of an expandable sand screen and monitoring its condition with an electromagnetic (EM) detection tool. Electromagnetic sensing may provide continuous in situ measurements of parameters related to the condition of surrounding pipes in cased wellbore 110s. As a result, EM sensing may be used in wellbore 110 monitoring applications, where wellbore 110 may be cased or uncased. For example, EM tools may measure eddy currents to determine metal profile of expandable sand screen. The EM tools may operate on a conveyance. EM tool may include an independent power supply and may store the acquired data on memory.

An expandable sand screen (ESS) may provide sand control completion and reservoir compliance through positive wellbore support. For example, the ESS is a specialized expandable sand-control screen that features hydraulic expansion as opposed to the more common mechanical version. This technology offers operators many conceivable advantages. For examples, advantages may include positive wellbore support for the well life, reservoir management with full inflow control capability, inner strength to support much higher geo-mechanical loads than conventional expandable screen, single-trip installation with record time saving, and rapid and reliable activation method for wellbore compliance.

During its lifetime, an ESS tool should be monitored to determine the condition and effectiveness of the ESS tool. Non-invasive detection techniques such as electromagnetic wave and acoustic wave detection may be utilized to determine the condition and effectiveness of the ESS tool. In well completions, an operator may want to determine an activation state of the ESS. For example, an operator may want to know whether or not the ESS has expanded, and if so, by how much. As discussed below, an electromagnetic (EM) frequency-domain eddy current (EC) technique to estimate the activation state of the ESS.

Figure 1:
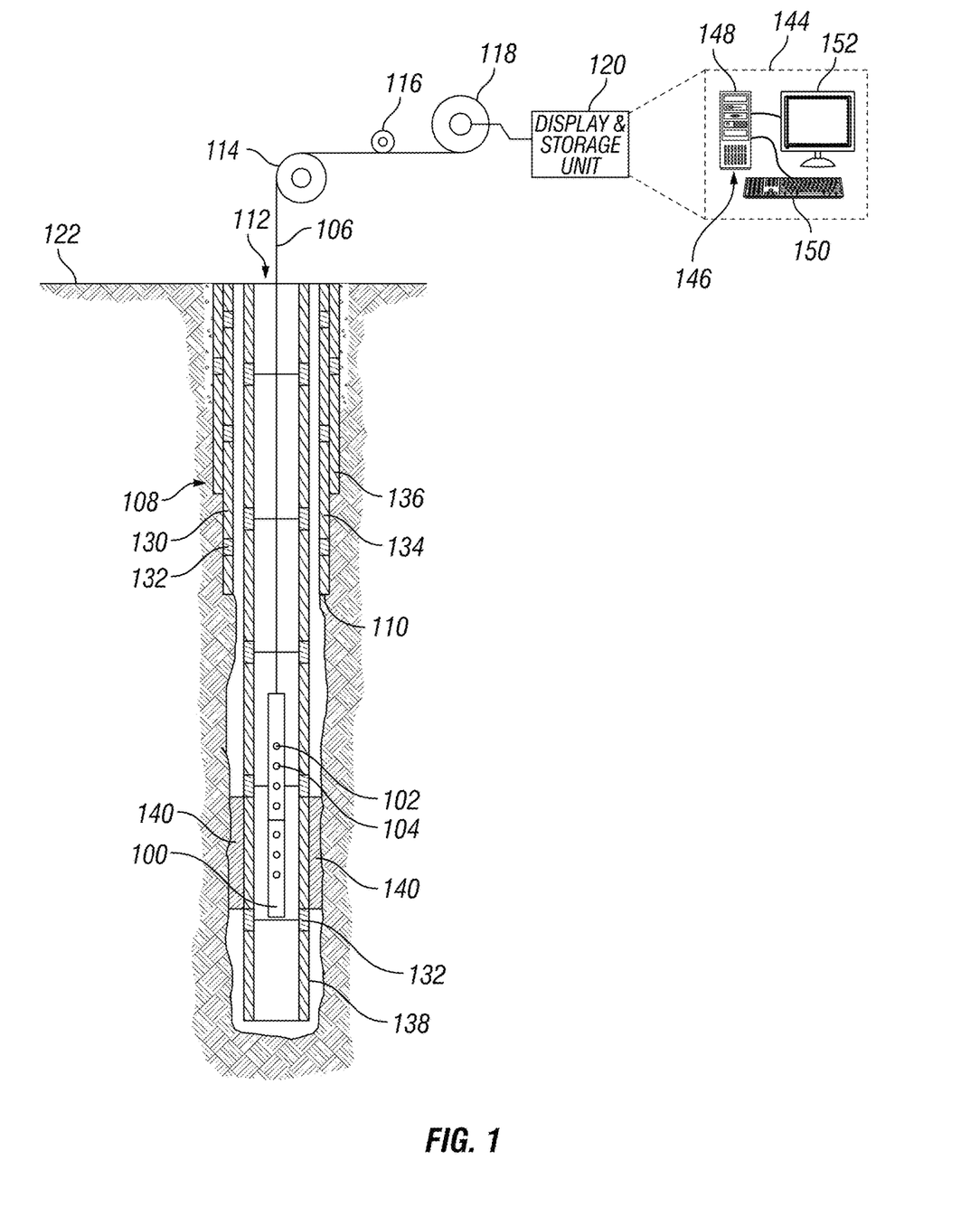
FIG. 1 illustrates an EM detection tool disposed in a pipe string of an open borehole.

FIG. 1 illustrates an operating environment for an EM detection tool 100 as disclosed herein. EM detection tool 100 may comprise a transmitter 102 and/or a receiver 104. In examples, there may be any number of transmitters 102 and/or any number of receivers 104, which may be disposed on EM detection tool 100. As illustrated, receivers 104 may be positioned on the EM detection tool 100 at selected distances (e.g., axial spacing) away from transmitters 102. The axial spacing of receivers 104 from transmitters 102 may vary, for example, from about 0 inches (0 cm) to about 40 inches (101.6 cm) or more. It should be understood that the configuration of EM detection tool 100 shown on FIG. 1 is merely illustrative and other configurations of EM detection tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM detection tool 100 may include more than one transmitter 102 and more or less than six of the receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may broadcast, for example, a multi-frequency signal or a broadband signal. While not shown, EM detection tool 100 may include a transmitter 102 and receiver 104 that are in the form of coils or solenoids coaxially positioned within a downhole tubular (e.g., casing string 108) and separated along the tool axis. Alternatively, EM detection tool 100 may include a transmitter 102 and receiver 104 that are in the form of coils or solenoids coaxially positioned within a downhole tubular (e.g., casing string 108) and collocated along the tool axis.

In additional examples, transmitter 102 may function and/or operate as a receiver 104. EM detection tool 100 may be operatively coupled to a conveyance 106 (e.g., wireline, slickline, coiled tubing, pipe, downhole tractor, and/or the like) which may provide mechanical suspension, as well as electrical connectivity, for EM detection tool 100. Conveyance 106 and EM detection tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by EM detection tool 100 may be stored on memory and then processed by display and storage unit 120 after recovery of EM detection tool 100 from wellbore 110. Alternatively, signals recorded by EM detection tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to EM detection tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. EM detection tool 100 may be dimensioned so that it may be lowered into the wellbore 110 through pipe string 138, thus avoiding the difficulty and expense associated with pulling pipe string 138 out of wellbore 110. Disposed on pipe string 138 in an uncased wellbore 110 may be an expandable sand screen 140.

Figure 2:
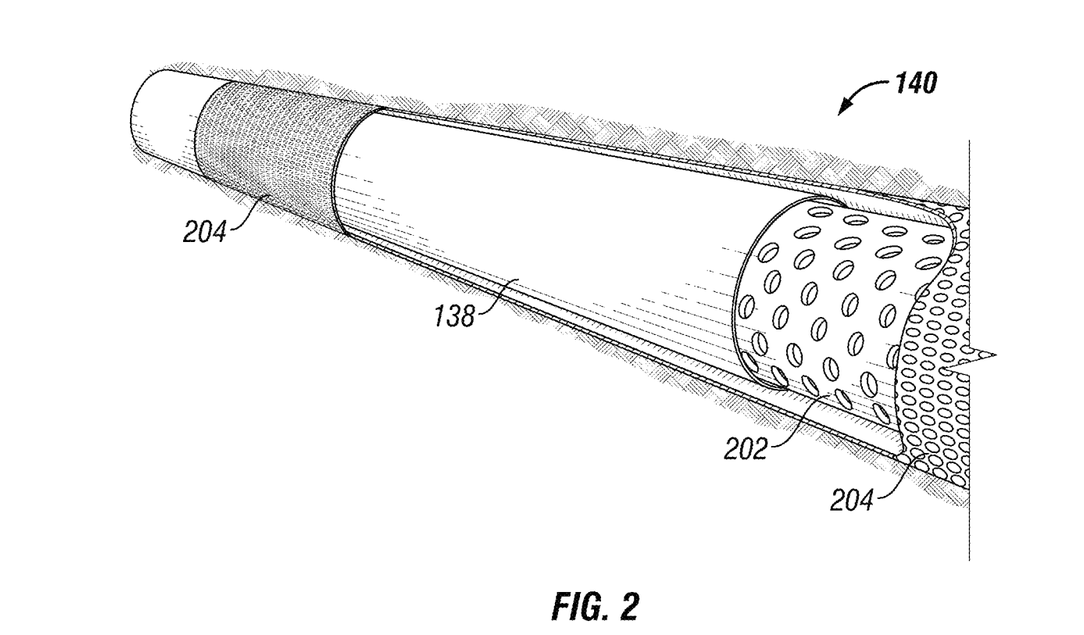
FIG. 2 illustrates an expandable sand screen system disposed on a pipe string.
Figure 3:
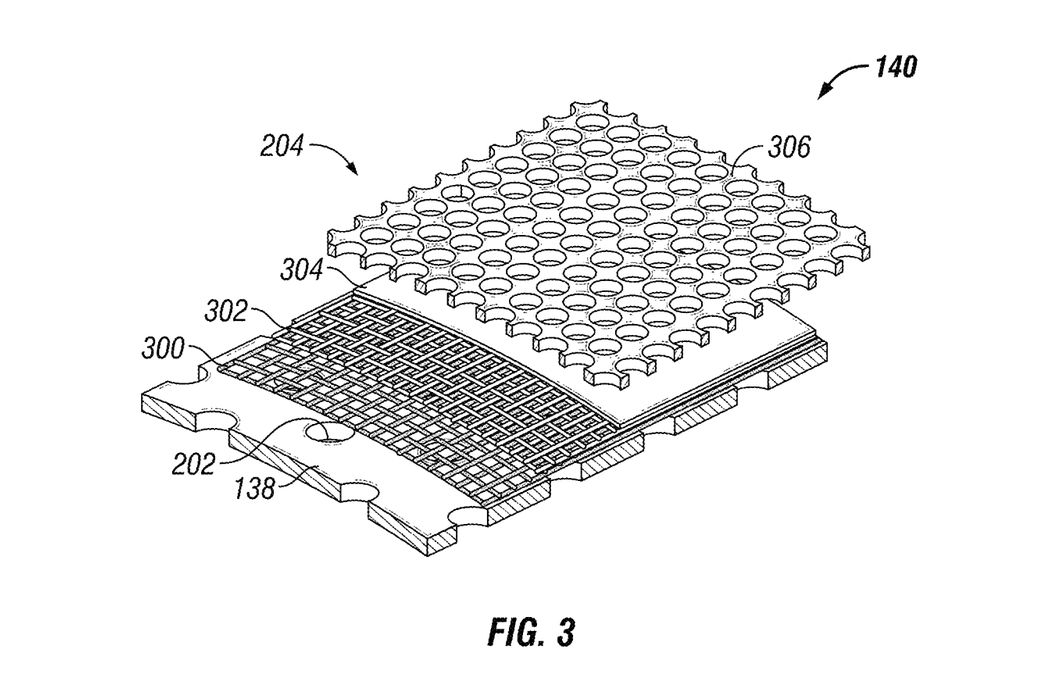
FIG. 3 illustrates a detailed view of the expandable sand screen.

In examples, expandable sand screen 140 may prevent migration of sand to the interior of pipe string 138. As illustrated in FIG. 2, expandable sand screen 140 may comprise at least one perforation 202 disposes in pipe string 138. Screen 204 may cover perforations 202. This may prevent the flow of sand into wellbore 110. FIG. 3 illustrates a more detailed view of expandable sand screen 140. Perforations 202 within pipe string 138 may be covered by screen 204 which may include a plurality of screen layers. Each layer may be a different material that may be resistant to abrasion and metal loss. Each material may include different electrical properties for electrical conductivity and magnetic permeability. For example, there may be a lower drainage mesh layer 300, support drainage layer 302, and plain dutch weave filtration layer 304, all of which may be covered by outer shroud 306.

With continued reference to FIG. 3, the constant flow and harsh downhole environment may erode and corrode the metal alloys that comprise expandable sand screen 140 with the damage generally starting on outer shroud 306 and propagating to the interior of sand screen system 200 including pipe string 138. If damage to sand screen system 200 is significant, sand migration to the interior of wellbore 110 (e.g., referring to FIG. 1) increases, which may impact the operations within wellbore 110.

Expandable sand screen 140 (i.e., ESS) may be a form of open hole completion, which may achieve superior completion results in deep water, multilaterals, heavy oil fields, or wherever sand migration is a problem. Expandable sand screen 140 may be rapid, safe, and be a reliable single-trip installation, which may achieve significant reductions in overall completion time compared to conventional techniques.

EM detection tool 100 (e.g., referring to FIG. 1) may help the deployment of expandable sand screen 140 (e.g., or any other ESS or ES solution in the market) and further monitoring during the wellbore lifetime. To inspect the condition of expandable sand screen 140, non-invasive electromagnetic (EM) techniques utilized with EM detection tool 100 may play an important role. In examples, the eddy current (EC) effect of an EM wave may be applied to characterize pipe string 138 and expandable sand screen 140 around wellbore 110 (e.g. referring to FIG. 1).

EM detection tool 100 may utilize a digital telemetry system to determine the deployment of expandable sand screen 140, wherein an electrical circuit may be used to both supply power to EM detection tool 100 and to transfer data between display and storage unit 120 and EM detection tool

100. A DC voltage may be provided to EM detection tool 100 by a power supply located above ground level, and data may be coupled to the DC power conductor by a baseband current pulse system. Alternatively, EM detection tool 100 may be powered by batteries located within the downhole tool assembly, and/or the data provided by EM detection tool 100 may be stored within the downhole tool assembly, rather than transmitted to the surface during metal loss (metal loss detection).

EM detection tool 100 may be used for excitation of transmitter 102. Receivers 104 may be positioned on the EM detection tool 100 at selected distances (e.g., axial spacing) away from transmitters 102. The axial spacing of receivers 104 from transmitters 102 may vary, for example, from about 0 inches (0 cm) to about 40 inches (101.6 cm) or more. It should be understood that the configuration of EM detection tool 100 shown on FIG. 1 is merely illustrative and other configurations of EM detection tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary.

As illustrated in FIG. 1, EM detection tool 100 may include more than one transmitter 102 and more or less than six of the receivers 104. For example, EM detection tool 100 may comprise an activation chamber 400 and a high-resolution section 402. In examples, transmitter 102 may be a coil implemented for transmission of magnetic field while also measuring EM fields, in some instances. Where multiple transmitters 102 are used, their operation may be multiplexed or time multiplexed. For example, a single transmitter 102 may transmit, for example, a multi-frequency signal or a broadband signal. While not shown, EM detection tool 100 may include a transmitter 102 and receiver 104 that are in the form of coils or solenoids coaxially positioned within a downhole tubular (e.g., casing string 108) and separated along the tool axis. Alternatively, EM detection tool 100 may include a transmitter 102 and receiver 104 that are in the form of coils or solenoids coaxially positioned within a downhole tubular (e.g., casing string 108) and collocated along the tool axis.

EM detection tool 100 may emit electromagnetic energy at multiple programmable frequencies continuously. Each transmitter 102 may emit multiple frequencies simultaneously. The response from expandable sand screen 140 (Referring to FIG. 2) may be received by an array of receivers 104. EM detection tool 100 may measures phase and amplitude differences from the electromagnetic energy waves being produced from transmitters 102. Processing the differences may indicate information about any ferrous material in wellbore 110, which may be disposed in completions hardware and/or expandable sand screen 140. A high resolution section may be designed to analyze in detail regions closest to EM detection tool 100, which may include innermost pipes, for example first casing 134 and second casing 136. The region near EM detection tool 100 may be where expandable sand screen 140 may be disposed. The high resolution section may utilize a relatively higher frequency and the excitation is generated by a relatively shorter transmitter 102 to generate fields in the region closer to EM detection tool 100. The distance between transmitter 102 and receivers 104 may be smaller in the high resolution section. Receivers 104 disposed close to transmitter 102 may benefit from the use of bucking coils to improve sensitivity to expandable sand screen 140.

A primary section of EM detection tool 100 may include a transmitter 102 and an array of receivers 104, but with larger transmitter-receiver spacing. This section may measures all outer casings and may focus on deeper field information. The primary section may also provide additional information on expandable sand screen 140, although with less resolution. In cases where expandable sand screen 140 may be disposed in a larger diameter pipe string 138, measurements from the primary section may be very useful in determining the status of expandable sand screen 140.

Transmission of EM fields by the transmitter 102 and the recordation of signals by receivers 104 may be controlled by display and storage unit 120, which may include an information handling system 144. As illustrated, the information handling system 144 may be a component of the display and storage unit 120. Alternatively, the information handling system 144 may be a component of EM detection tool 100. An information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with EM detection tool 100 and/or software executed by processing unit 146. For example, information handling system 144 may enable an operator to select analysis options, view collected log data, view analysis results, and/or perform other tasks.

EM detection tool 100 may use any suitable EM technique in the frequency domain and/or the time domain. In frequency domain EC techniques, transmitter 102 of EM detection tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed along with the primary electromagnetic fields by the receivers 104.

Characterization of expandable sand screen 140 may be performed by measuring and processing these electromagnetic fields.

Determination of expandable sand screen 140 state change may be of importance during deployment of expandable sand screen 140. Using EM detection tool 100 with an electromagnetic (EM) eddy current (EC) technique may determine the state change of expandable sand screen 140. One or more transmitters 102 may be excited with an excitation signal and the signals from the surrounding objects may be received and recorded by receiver 104 for interpretation (e.g., referring to FIG. 1). The received signal may be typically proportional to the amount of metal that may be around transmitter 102 and receiver 104. For example, less signal magnitude may be an indication of more metal, while more signal magnitude may be an indication of less metal. This may allow an operator to use this relationship to make measurements of the amount of metal loss. Azimuthal eddy current flow has different intensity and flow path before and after expansion, due to the change in the cross section of expandable sand screen 140. The received signal may thus be related to the metal profile of expandable sand screen 140 state. Therefore, the EM EC technique may be used to determine the activation state of expandable sand screen 140.

In time domain EC techniques, which may also be referred to as pulsed EC ("PEC"), transmitter 102 may be fed by a pulse. Transient primary electromagnetic fields may be produced due the transition of the pulse from "off" to "on" state or from "on" to "off" state (more common). These transient electromagnetic fields produce EC in the concentric pipes (e.g., casing string 108 and pipe string 138). The EC, in turn, produce secondary electromagnetic fields that may be measured by receivers 104 placed at some distance on the EM detection tool 100 from transmitter 102, as shown on FIG. 1. Alternatively, the secondary electromagnetic fields may be measured by a co-located receiver (not shown) or with transmitter 102 itself.

In frequency-domain EC techniques, a transmitter coil (i.e., transmitter 102) may be fed by a continuous sinusoidal signal, producing primary fields that illuminate pipe string 138, expandable sand screen 140, and casings disposed around pipe string 138. The primary fields produce Eddy currents in pipe string 138, expandable sand screen 140, and casings disposed around pipe string 138. These Eddy currents, in turn, produce secondary fields that may be sensed along with the primary fields in receiver coils (i.e., receiver 104) that may be placed at a distance from transmitter 102. Characterization of pipe string 138, expandable sand screen 140, and casings disposed around pipe string 138 may be performed by measuring and processing these fields.

Figure 4A:
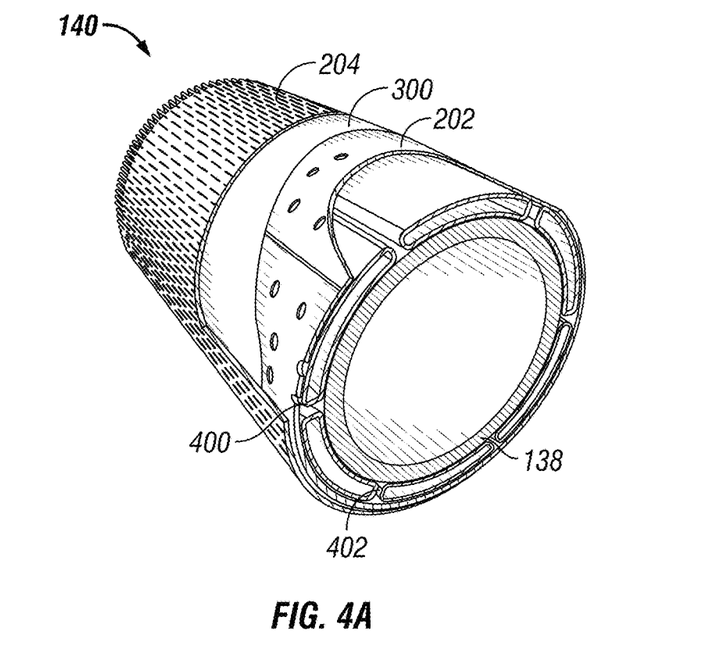
FIG. 4a illustrates a cut away view of a non-activated expandable sand screen disposed on a pipe string.
Figure 4B:
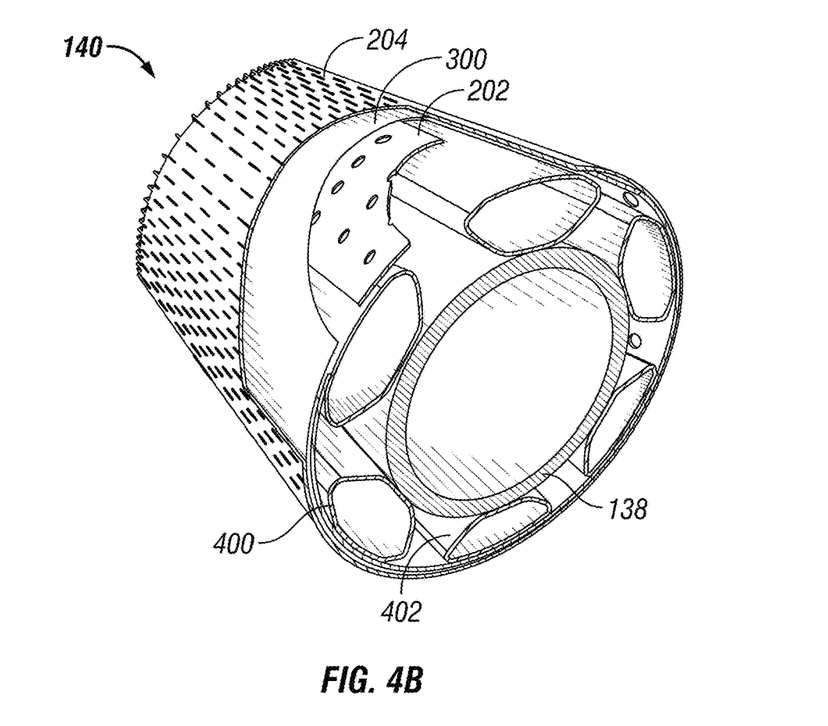
FIG. 4b illustrates a cut away view of an activated expandable sand screen disposed on a pipe string.

FIG. 4a illustrates expandable sand screen 140 before being run into wellbore 110 (i.e., referring to FIG. 1). As illustrated in FIGS. 4a and 4b, expandable sand screen 140 may comprise perforations 202, screen 204, lower drainage mesh layer 300, activation chambers 400, and high-resolution section 402 disposed around pipe string 138. It should be noted that lower drainage mesh layer 300 may also comprise support drainage layer 302, and plain Dutch Weave filtration layer 304, all of which may be covered by outer shroud 306 (i.e., referring to FIG. 3). As illustrated in FIG. 4a, activation chambers 400 may be in a shrunk configuration so that expandable sand screen 140 may be run into wellbore 110. Once expandable sand screen 140 reaches a desired depth, activation chamber 400 may be expanded, as illustrated in FIG. 4b, to comply with the sandface. To expand internal tubing pressure is applied from the surface via the rig's cement unit. This pressurizes the screen's activation chambers 400, causing the diameter of screen 204 to increase and fill the annular gap to achieve compliance. Then, lower drainage mesh layer 300, support drainage layer 302, and plain Dutch Weave filtration layer 304, all of which may be covered by outer shroud 306 may expand to comply with the sandface once activation chambers 400 may be activated. Determination of expandable sand screen 140 state change may be of importance during the deployment. In addition, EM detection tool 100 may be employed to examine the compliance with wellbore 110 wall and monitor the condition of expandable sand screen 140.

Figure 5A:
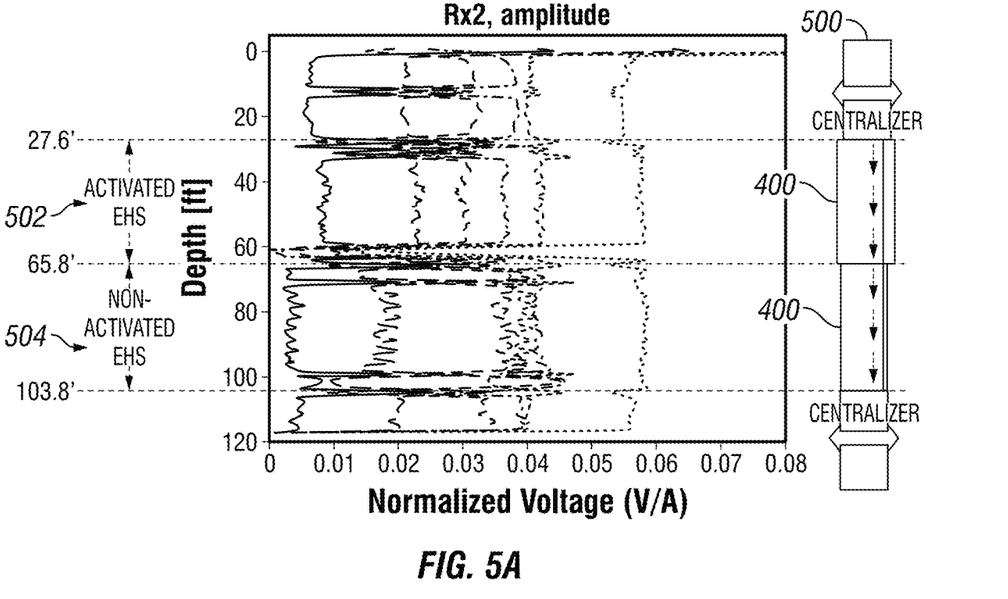
FIG. 5a illustrates a log based on amplitude of a non-activated and activated expandable sand screen disposed on a pipe string.
Figure 5B:
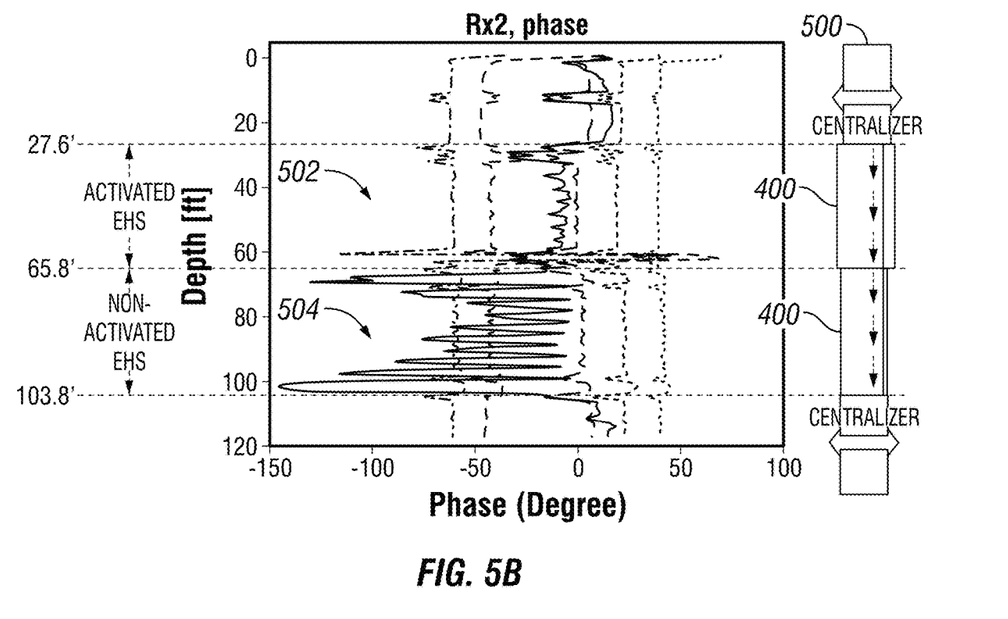
FIG. 5b illustrates a log based on phase of a non-activated and activated expandable sand screen disposed on a pipe string.

FIGS. 5a and 5b illustrate two logging of two ESS pipes 500 of 38' long comprising expandable sand screen 140. In FIG. 5a, first ESS pipe 500 within 27.1' and 65.1' is activated, which may be identified as 502. While the section with 65.1' and 103.1' is non-activated, which is identified as 504. The response due to 504 is fluctuating. The reason is that the activation chamber 400 is folded, causing non-uniform pipe thickness profile. When activation chamber 400 is expanded, as in 502, the pipe thickness distribution becomes uniform, leading to a relative uniform response. Due to the connection of two joints, the response at joints usually presents as a spike. The response a few feet away from the spikes may be used for estimation purposes. As illustrated, certain frequencies are seen to have higher sensitivity to the activation state of ESS pipe 500.

As discussed below, three different methods may be utilized to determine the activation of expandable sand screen 140 in ESS pipe 500. Those methods may be standard deviation and correlation, pattern recognition, and the database inquiry.

Figure 6:
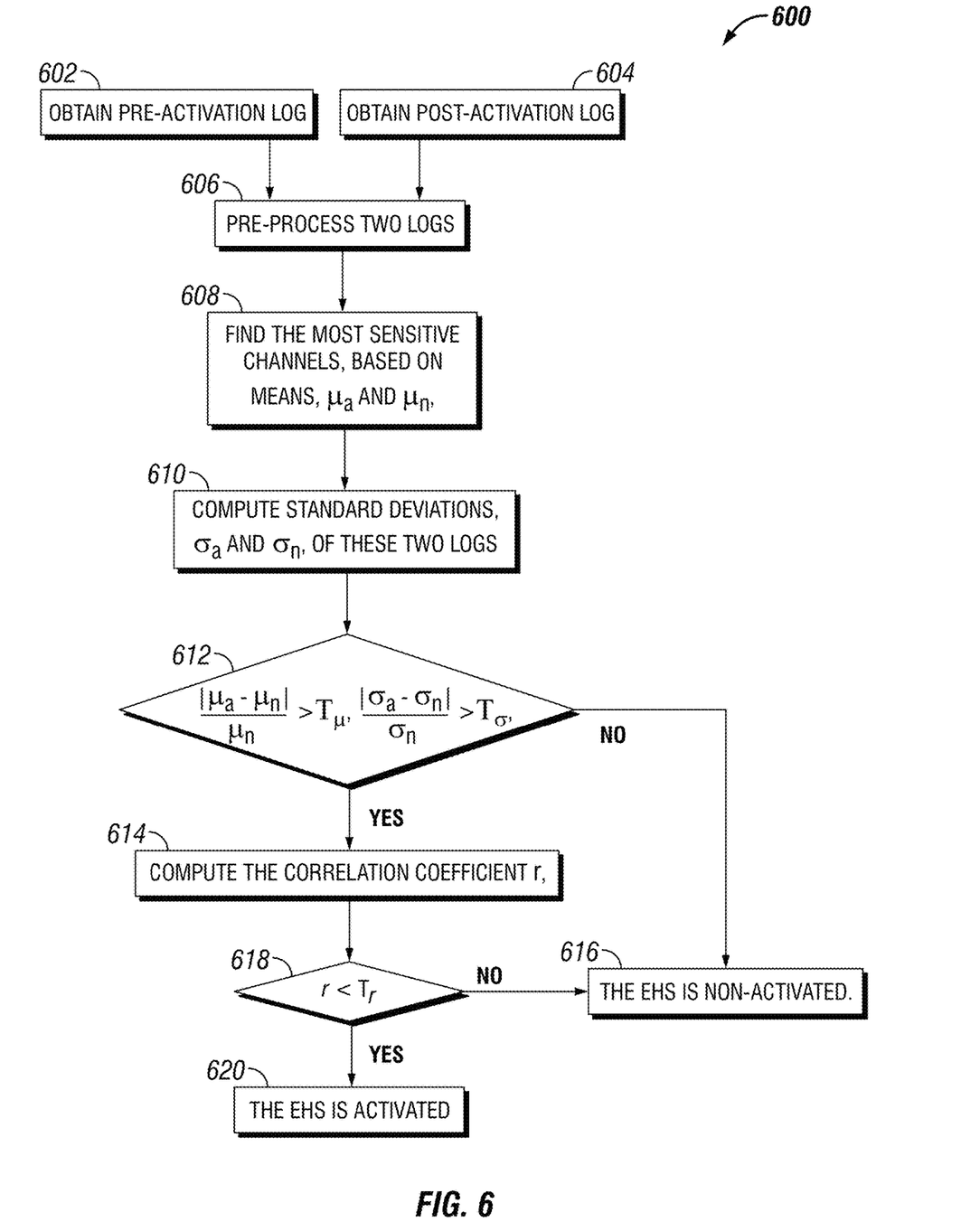
FIG. 6 illustrates the flow chart for determining if expandable sand screen is activate or not activate based on a standard deviation.

FIG. 6 illustrates a flow chart 600 that uses a standard deviation and correlation method to determine the activation of expandable sand screen 140 in ESS pipe 500. Flow chart 600 may begin with obtaining a pre-activation log in step 602 and obtaining a post-activation log in step 604. Obtaining a pre-activation log in step 602 may act as a baseline, when activation chamber 400 (i.e., referring to FIG. 5a) is closed. The baseline log may be acquired as EM detection tool 100 may be lowered into wellbore 110 (i.e., referring to FIG. 1). It may even be obtained before inserting ESS pipe 500 comprising expanding sand screen 140 into wellbore 110. Obtaining a post-activation log in step 604 may be produced after activation chamber 400 is activated. It may be acquired as EM detection tool 100 is logged up wellbore 110. It should be noted that the operation of "logged up" includes logging and producing a log as EM detection tool 100 is pulled up through wellbore 110 to surface 122.

In step 606, pre-process two logs may be implemented. The pre-activation log and the post-activation log may be pre-processed in these two steps. To begin, both logs may be aligned with each other side by side. As there may be a depth difference between two logs, a depth shifting may be implemented. The alignment may be completed by matching particular signatures, like collar (not illustrated), centralizer (not illustrated), and/or the like. During this step, noisy channels may be removed. It may be important to remove noisy channels before any further analysis, because the result may fail and/or be skewed with the noisy data. The noisy channel can be removed by applying any suitable method. Such methods may implement cross-covariance coefficients and dynamic ranges. Additionally, in step 606, section of the compared logs may be chopped. This may be due to the presence of spikes due to collar or any other metal bumps. Chopping these section with uniform log profile may avoid any false analysis related to the expansion of expanding sand screen 140. Collar may be easily identified with current methods and the collar signature may have a fix bandwidth. Thus, this may allow an operator to cut a section apart in the log to a certain length to remove collar signatures.

In step 608, the operator may then find the most sensitive channels, based on means, $\mu_a$ and $\mu_n$. In step 608 the means $\mu_a$ and $\mu_n$ may be computed of the two chopped logs, described above, for each channel. For the most sensitive channel, the response due to an activated expandable sand screen 140 has a largest signal level and phase changes from non-activated expandable sand screen 140. Sensitivity may be dependent on the base pipe outside dimension and thickness. In examples, the most sensitive channels may be chosen based on the average signal level, which may be defined by the mean of the absolute value and phase of the raw data. Once these two logs are aligned and chopped, an operator may calculate the mean of these two logs with respect to activated expandable sand screen 140 and non-activated expandable sand screen 140, $\mu_a(f_i,R_j)$ and $\mu_n(f_i,R_j)$, using the formulas below:

$$\mu_a(f_i, R_j) = \frac{1}{N} \sum_{K=1}^{K} V_a(f_i, R_j, Z_k) \qquad (1)$$

$$\mu_n(f_i, R_j) = \frac{1}{N} \sum_{K=1}^{K} V_n(f_i, R_j, Z_k) \qquad (2)$$

where $V_a(f_i,R_j,z_k)$ and $V_n(f_i,R_j,z_k)$ are normalized voltage, which are functions of operating frequency, transmitter-receiver spacing, and logging depth. Then, the sensitivity of the channels may be quantitated as the magnitude change and phase shift, which may be calculated using the formulas, respectively, below:

$$s_a = \frac{|abs\langle\mu_a(f_i, R_j)\rangle - abs\langle\mu_n(f_i, R_j)\rangle|}{abs\langle\mu_n(f_i, R_j)\rangle} \qquad (3)$$

$$s_a = |phase\langle\mu_a(f_i, R_j)\rangle - phase\langle\mu_n(f_i, R_j)\rangle| \qquad (4)$$

Figure 7A:
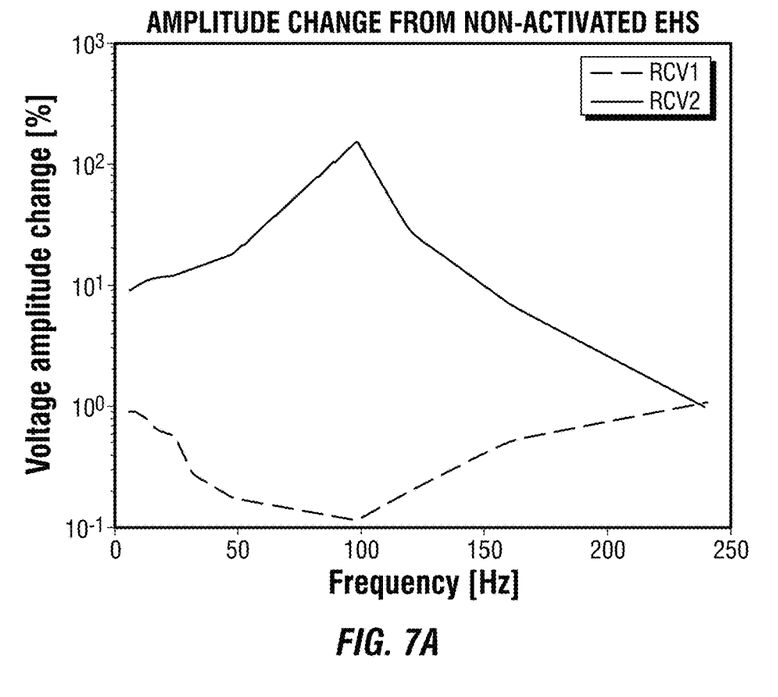
FIG. 7a illustrates a graph based on amplitude of a non-activate and activate expandable sand screen disposed on a pipe string.
Figure 7B:
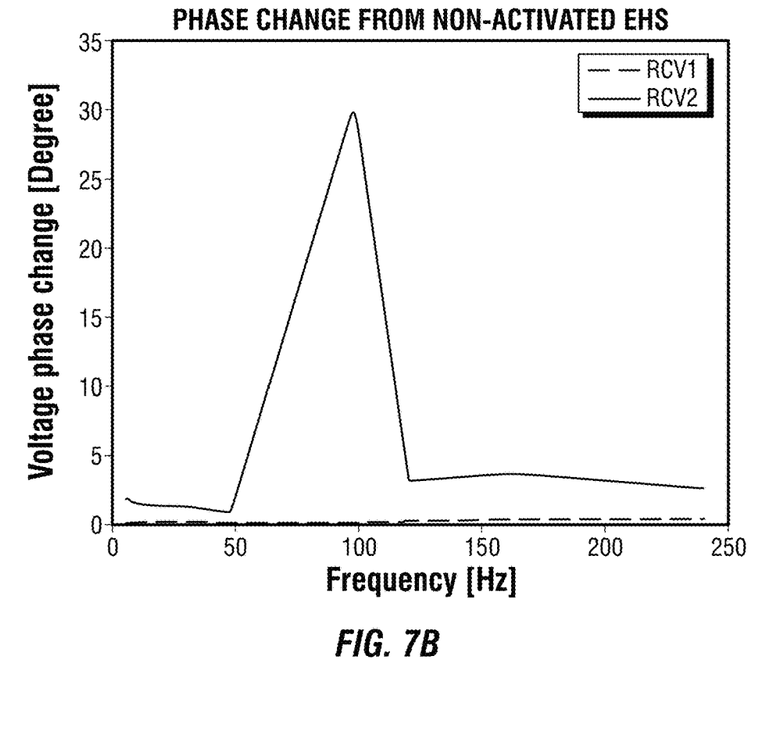
FIG. 7b illustrates a phase based on phase of a non-activate and activate expandable sand screen disposed on a pipe string.

FIGS. 7a and 7b shows the sensitivity of magnitude and phase versus frequency for a 1st receiver and a 2nd receiver. FIG. 7a illustrates sensitivity of magnitude and phase versus frequency for a non-activated expandable sand screen 140. FIG. 7b illustrates sensitivity of magnitude and phase versus frequency for an activated expandable sand screen 140. It may be seen that the 1st receiver is less sensitive to status change of expandable sand screen 140 than 2nd receiver. Thus, the 2nd receiver log may be utilized for analysis of the expansion or non-expansion of expandable sand screen 140. It may also be seen that the channel of 98 Hz has the largest sensitivity. Hence, this channel will be chosen for further analysis.

Referring back to FIG. 6, step 610 may compute a standard deviations $\sigma_a$ and $\sigma_n$ of the two logs from steps 602-608. In examples, the response due to non-activated expandable sand screen 140 is fluctuating, while the response due to a fully activated expandable sand screen 140 is relatively uniform. Thus, both the signal level and standard deviation are good indicator of the status of expandable sand screen 140. The standard deviation may be defined as seen below:

$$\sigma_a(f_i, R_j) = \sqrt{\frac{1}{k-1} \sum_{K=1}^{K} [abs\langle V_a(f_i, R_j, Z_k)\rangle - abs\langle\mu_a(f_i, R_j)\rangle]^2} \qquad (5)$$

$$\sigma_n(f_i, R_j) = \sqrt{\frac{1}{k-1} \sum_{K=1}^{K} [abs\langle V_n(f_i, R_j, Z_k)\rangle - abs\langle\mu_n(f_i, R_j)\rangle]^2} \qquad (6)$$

The standard deviation change of magnitude may be expressed as:

$$d_a = \frac{|\sigma_a(f_i, R_j) - \delta_n(f_i, R_j)|}{\sigma_n(f_i, R_j)} \qquad (7)$$

Similarly, the standard deviation change of phase $d_p$ may be calculated using following equation:

$$d_p = \frac{|\delta_a(f_i, R_j) - \delta_n(f_i, R_j)|}{\delta_n(f_i, R_j)} \qquad (8)$$

$$\delta_a(f_i, R_j) = \sqrt{\frac{1}{k-1} \sum_{K=1}^{K} [phase\langle V_a(f_i, R_j, Z_k)\rangle - phase\langle\mu_a(f_i, R_j)\rangle]^2} \qquad (9)$$

$$\delta_n(f_i, R_j) = \sqrt{\frac{1}{k-1} \sum_{K=1}^{K} [phase\langle V_n(f_i, R_j, Z_k)\rangle - phase\langle\mu_n(f_i, R_j)\rangle]^2} \qquad (10)$$

Once the standard deviation is determined in step 612 the activation or non-activation of expandable sand screen 140 is found. An operator may observe a considerable average signal level change and smaller standard deviation when expandable sand screen 140 is activated. It requires the conditions: $s_a > T_{\mu a}$, $s_p > T_{\mu p}$, $d_a > T_{\sigma a}$, and $d_p > T_{\sigma p}$. Additionally, the threshold, $T_{\mu a}$, $T_{\mu p}$, $T_{\sigma a}$, and $T_{\sigma p}$ may be pre-set by performing some tests. For example if:

$$\frac{|\mu_a - \mu_n|}{\mu_n} > T_\mu, \frac{|\sigma_a - \sigma_n|}{\sigma_n} > T_\sigma \qquad (11)$$

then the operator may proceed to step 614. If Equation (11) is not satisfied, the operator proceeds to step 616 which indicates that expandable sand screen 140 is non-activated. Table 1 illustrates an example of readings found when the Frequency is 98 Hz.

TABLE 1

| Frequency | $s_a$ | $s_p$ | $d_a$ | $d_p$ |
| --- | --- | --- | --- | --- |
| 98 Hz | 149.7 | 33.6 | 19.3 | 88.3 |

In step 614, the operator may compute the correlation coefficient r. Because the responses due to an activated and non-activated expandable sand screen 140 may be different, the correlation coefficient between these two responses may be small. With the response of a non-activated expandable sand screen 140 as a baseline, the smaller the correlation coefficient, the larger extent expandable sand screen 140 is expanded to. Due to constant change of the metal profile of expandable sand screen 140, the EM response changes accordingly. Thus, the correlation coefficient between these two logs may be small. The correlation coefficient is defined as:

$$\rho_a(V_a, V_n) = \frac{1}{K-1} \sum_{K=1}^{K} \left( \frac{\text{abs}\langle V_a(f_i, R_j, Z_k)\rangle - \text{abs}\langle \mu_a(f_i, R_j)\rangle}{\sigma_a(f_i, R_j)} \right) \quad (12)$$

$$\left( \frac{\text{abs}\langle V_n(f_i, R_j, Z_k)\rangle - \text{abs}\langle \mu_n(f_i, R_j)\rangle}{\sigma_n(f_i, R_j)} \right)$$

where α denotes the amplitude or phase of the complex measured voltage data V, f is the frequency, and z is the depth interval per zone. The correlation coefficients of amplitude and phase of the above logs are given as $\rho_a$=0.025 and $\rho_p$=−0.183, indicating a weak relationship between these two logs. Therefore, in step 618 if r<$T_r$ than expandable sand screen 140 is activated and proceeds to step 620, revealing that expandable sand screen 140 is activated. If r>$T_r$ than expandable sand screen 140 is non-activated and the operator proceeds to step 616.

Figure 8:
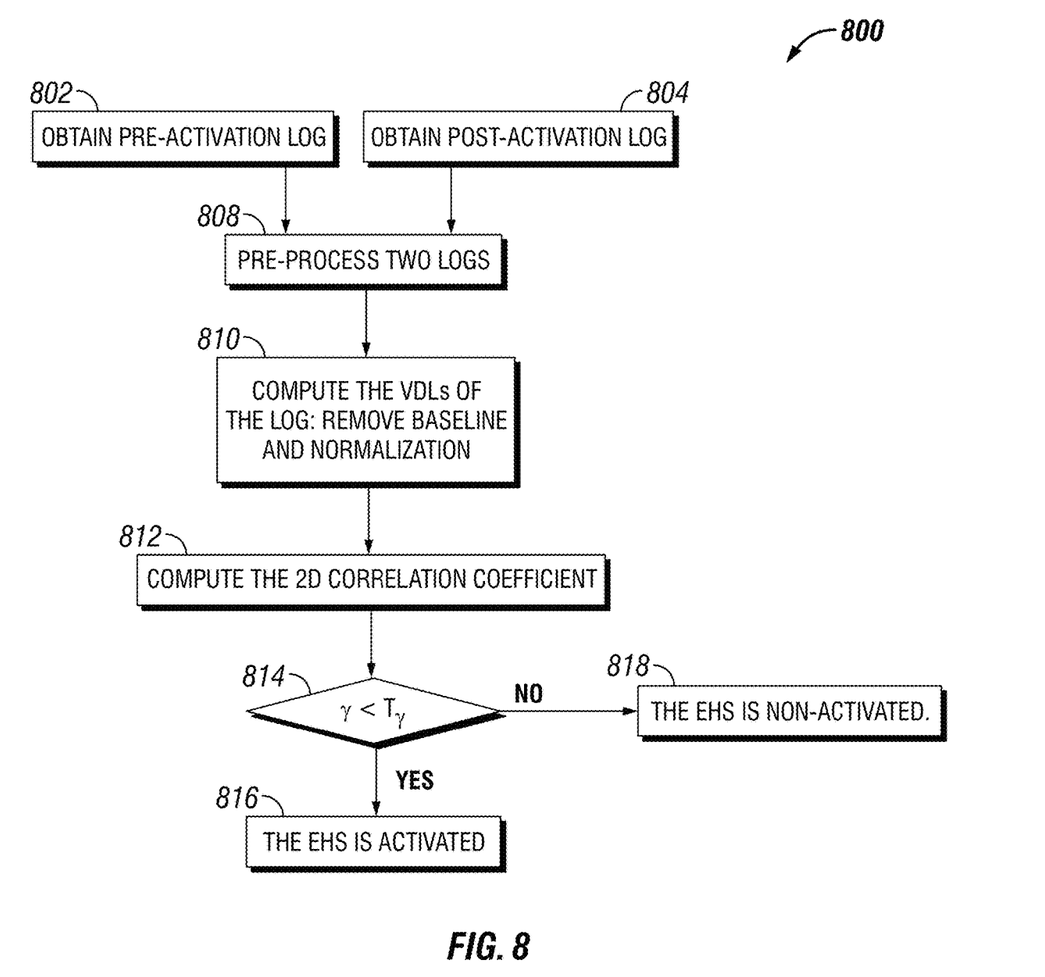
FIG. 8 illustrates a flow chart for determining if expandable sand screen is activate or not activate based on a variable density log.

A second solution to determine if expandable sand screen 140 is activated or non-activate is proposed below. FIG. 8 illustrates a flow chart 800 that uses a variable density log (VDL) method to determine the activation of expandable sand screen 140 in ESS pipe 500 (i.e., referring to FIG. 5). Flow chart 800 may begin with obtaining a pre-activation log in step 802 and obtaining a post-activation log in step 804. Obtaining a pre-activation log in step 802 may act as a baseline, when activation chamber 400 (i.e., referring to FIG. 5a) is closed. The baseline log may be acquired as EM detection tool 100 may be lowered into wellbore 110 (i.e., referring to FIG. 1). It may even be obtained before inserting ESS pipe 500 comprising expanding sand screen 140 into wellbore 110. Obtaining a post-activation log in step 804 may be produced after activation chamber 400 is activated. It may be acquired as EM detection tool 100 is logged up wellbore 110.

In step 806, pre-process two logs may be implemented. The pre-activation log and the post-activation log may be pre-processed in these two steps. To begin, both logs may be aligned with each other side by side. As there may be a depth difference between two logs, a depth shifting may be implemented. The alignment may be completed by matching particular signatures, like collar (not illustrated), centralizer (not illustrated), and/or the like. During this step, noisy channels may be removed. It may be important to remove noisy channels before any further analysis, because the result may fail and/or be skewed with the noisy data. The noisy channel can be removed by applying any suitable method. Such methods may implement cross-covariance coefficients and dynamic ranges. Additionally, in step 806, section of the compared logs may be chopped. This may be due to the presence of spikes due to collar or any other metal bumps. Chopping these section with uniform log profile may avoid any false analysis related to the expansion of expanding sand screen 140. Collar may be easily identified with current methods and the collar signature may have a fix bandwidth. Thus, this may allow an operator to cut a section apart in the log to a certain length to remove collar signatures.

In step 808, an operator may compute the VDLs of both logs and remove the baseline and normalization of both logs. Before any algorithm is applied to determine the state of expandable sand screen 140, two steps may be taken to remove any baseline from the signal and to normalize the signal to obtain fixed limits. An optimized band-pass filter may be utilized to remove baseline in raw data. Then, the signal may be passed through a normalization process to remove environmental variations. This allows further algorithm to ignore baseline, signal amplitude and signal phase variations due to environment.

Figure 9A:
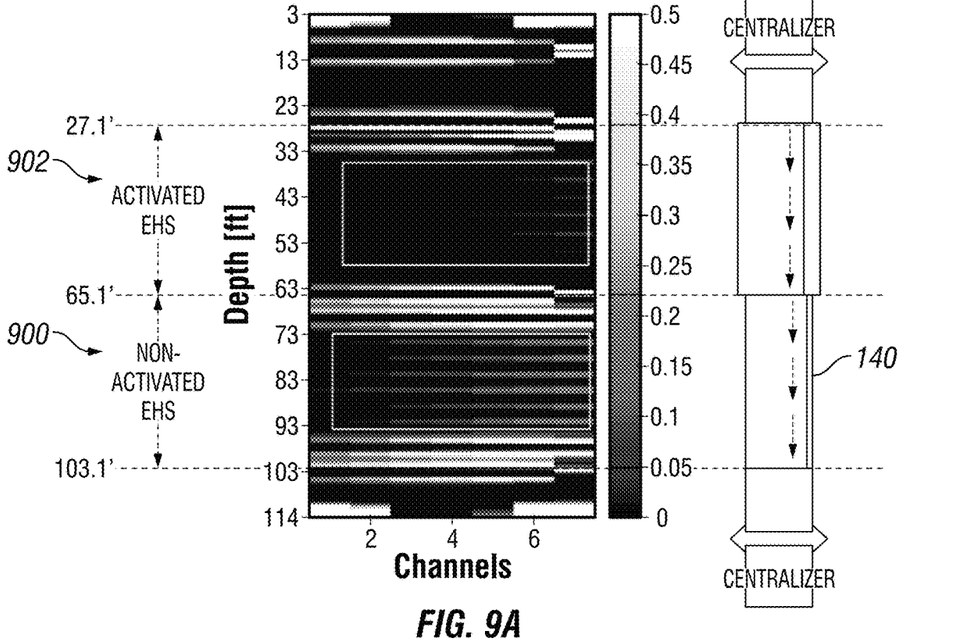
FIG. 9a illustrates a variable density log of a non-activated section and activated section of an expandable sand screen disposed on a pipe string.
Figure 9B:
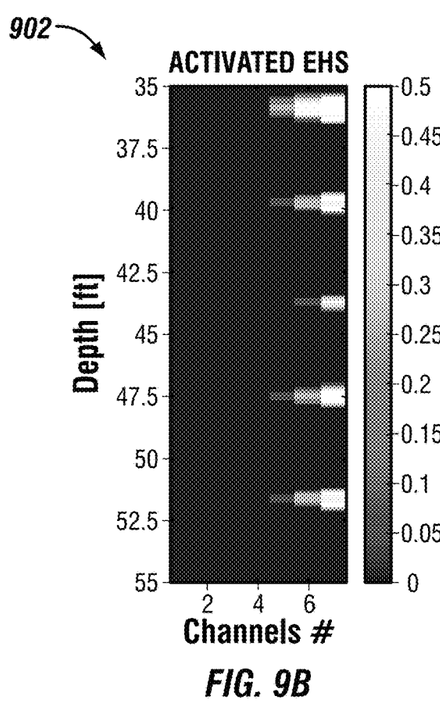
FIG. 9b illustrates an activated section of an expandable sand screen.
Figure 9C:
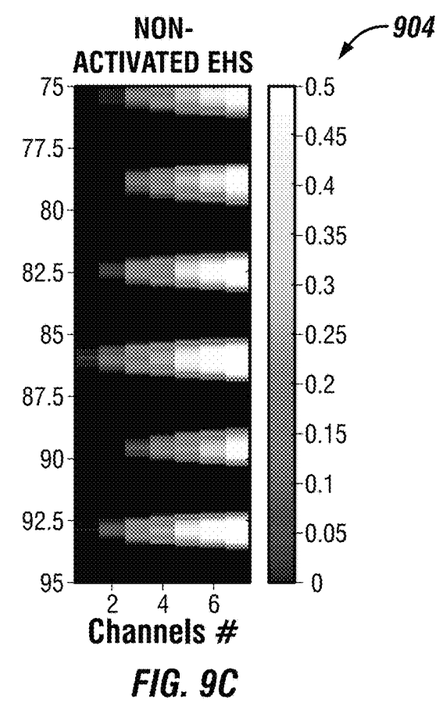
FIG. 9c illustrates a non-activated section of an expandable sand screen.

FIGS. 9a-9c illustrate the VDL visualization of a log representing expandable sand screen 140. The X-axis is channel index where each channel is a different combination of frequency and receiver, while the y-axis is depth. Only the phases of the channels may be used to generate this image. In section 900 there are periodic streaks which may indicated a non-activated expandable sand screen 140, corresponding to the parts having thicker metal. However, the signature of a streak in section 902 may not be obvious, because activation chamber 400 (i.e., referring to FIG. 4) of expandable sand screen 140 is activated and metal distribution is even. Identification of a periodic streak may be utilized to recognize the state of expandable sand screen 140 by visual inspection. However, pattern matching methods may be utilized to efficiently and automatically determine the status, which may be performed in step 812.

Referring back to FIG. 8, in step 812 an operator may computer a 2D correlation coefficient. Step 812 may begin by computing the normalized cross-correlation of the images from non-activated and activated expandable sand screen 140. The result contains correlation coefficients, which reveals the relationship between sections 900 and 902 (i.e., referring to FIG. 9). Since the correlation coefficient is normalized, the value of one means perfect match. And the higher the correlation coefficient is, the stronger relationship is. The normalized correlation coefficient may be calculated using the following equation:

$$\gamma = \frac{\sum_{x,y} [f(x,y) - \bar{f}_{u,v}][t(x,y) - \bar{t}]}{\sqrt{\sum_{x,y} [f(x,y) - \bar{f}_{u,v}]^2 \sum_{x,y} [t(x,y) - \bar{t}]^2}} \quad (13)$$

In step 814 if γ>Tγ then expandable sand screen 140 is fully activate and the operator may proceed to step 816. For example, where f (x, y) is the image to be determined, $\bar{t}$ is the mean of the baseline image, $\bar{f}$ u, v is the mean of f (x, y). The normalized correlation coefficient is 0.4125, which indicates a weak relationship between these two images. Thus, the ESS is fully activated. In step 814 if γ>Tγ then expandable sand screen 140 is non-activate and the operator moves to step 818. It should be noted that different pattern matching techniques based on convolution or differencing may be utilized to determine the state of expandable sand screen 140.

Figure 10:
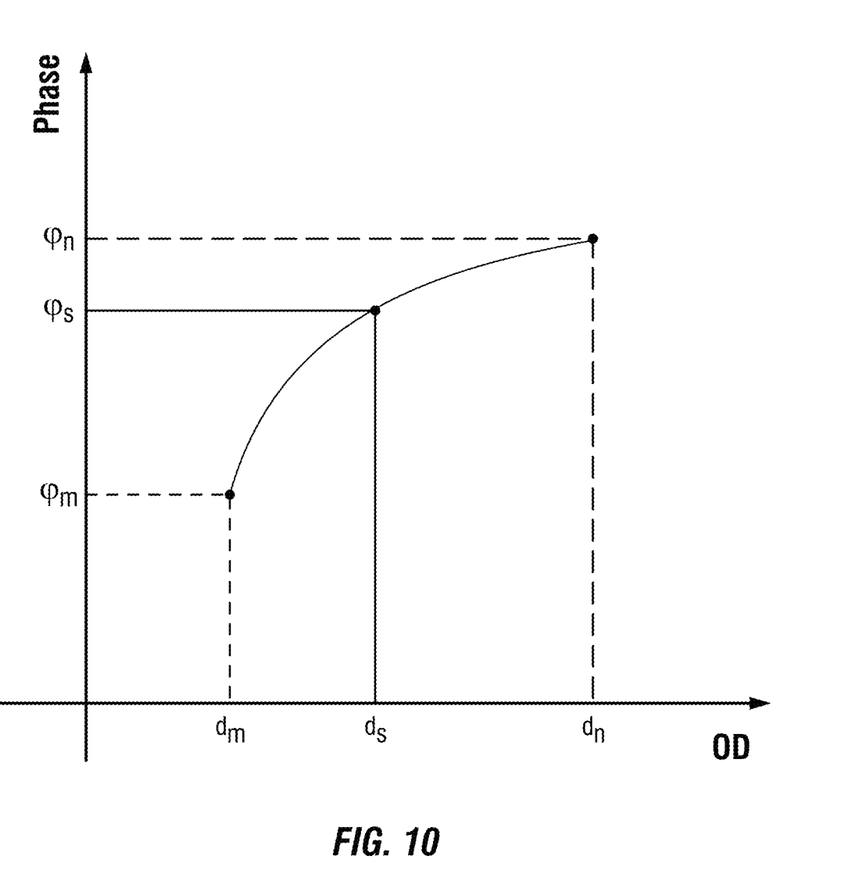
FIG. 10 illustrates a graph of the linear or quasi-linear relationship between the outer diameter of the expandable sand screen and phase of the log.

A third solution to determine if expandable sand screen 140 is activated or non-activate is proposed below. Logging data has illustrated that a log may be affected by the extent of the expansion of activation chamber 400 (i.e., referring to FIG. 4). It reveals that the outer diameter of expandable sand screen 140 may affect the amplitude and phase of the log. In examples, the log changes linearly or quasi-linearly to the outer diameter (OD) within a certain range, as shown in FIG. 10. Thus, an operator may be able to create a database which links the log and OD. The data may be constructed either by experiment or numerical simulation. By inquiring the database, the OD may be easily obtained once the log is ready.

As illustrated in FIG. 10, the linear or quasi-linear relationship between the outer diameter and phase of log between two points $(t_n, \varphi_n)^1$ and $(t_m, \varphi m)$ corresponding to maximum (nominal) and minimum OD of expandable sand screen 140. Any unknown OD $t_s$ is then estimated from this curve given the measured phase at the defected section $\varphi_s$.

Improvements over other techniques and tools may be found in that EM detection tool 100 may be used to estimate the activated or non-activated state of expandable sand screen 140 through the above described three methods. For example, some previous EM techniques utilizing an EM detection tool and processing techniques have not been able to accurately determine if an expandable sand screen has been activated or is non-activated, because these other techniques cannot produce a model that may simply be treated as concentric nested pipes. Additionally, these other techniques primarily use techniques associated with time-domain eddy current, while the methods disclosed herein utilize techniques associated with frequency domain eddy current. The methods described herein accurately process the collected data to determine if the expandable sand screen has been activated or is non-activated. This disclosure proposes several new approaches to process log and automatically and efficiently identify the activation state of expandable sand screen 140, even to quantitatively evaluate the activation extent.

The preceding description provides various examples of the systems and methods of use disclosed herein which may contain different method steps and alternative combinations of components.

Statement 1. A method for determining activation of an expandable sand screen, comprising: disposing an electromagnetic (EM) detection tool into a wellbore, wherein the EM detection tool comprises: at least one transmitter; and at least one receiver; transmitting an EM field from the at least one transmitter into the expandable sand screen to energize the expandable sand screen and form an eddy current; recording a voltage of the eddy current with the at least one receiver; and determining an activation state of the expandable sand screen based at least partially on the voltage of the eddy current.

Statement 2. The method of statement 1, wherein the at least one transmitter and the at least one receiver are coils.

Statement 3. The method of statement 1 or 2, further comprising: obtaining a pre-activation log; obtaining a post-activation log; and comparing the pre-activation log and the post-activation log.

Statement 4. The method of statement 3, wherein obtaining a pre-activation log is performed as the EM detection tool is lowered into the wellbore.

Statement 5. The method of statement 3, wherein obtaining a post-activation log is performed as the EM detection tool is logged up the wellbore.

Statement 6. The method of statement 3, further comprising aligning the pre-activation log and the post-activation log, removing at least one noisy channel from the pre-activation log and the post-activation log, and removing at least one noisy channel from the pre-activation log and the post-activation log.

Statement 7. The method of statement 3, further comprising: finding a channel sensitive to the expandable sand screen that is activated or non-activated; determining a standard deviation of the pre-activation log and the post-activation log; and identifying if the expandable sand screen is activated or non-activated.

Statement 8. The method of statement 3, further comprising: finding a channel sensitive to the expandable sand screen that is activated or non-activated; determining a correlation coefficient between the pre-activation log and the post-activation log, wherein the correlation coefficient is computed between an amplitude or phase of the pre-activation log and the post-activation log; and identifying if the expandable sand screen is activated or non-activated.

Statement 9. The method of statements 1-3, wherein a fluctuating voltage indicates the expandable sand screen is non-activated.

Statement 10. The method of statements 1-3 or 9, wherein a uniform voltage indicates the expandable sand screen is activated.

Statement 11. The method of statements 1-3, 9, or 10, further comprising: determining a variable density log (VDL) from the pre-activation log and the post-activation log, wherein determining the variable density log further comprises removing a baseline and normalizing the VDL; determining a 2D correlation coefficient, wherein the 2D correlation coefficient compares an image from the VDL of the pre-activation log and an image from the VDL of the post-activation log; and identifying if the expandable sand screen is activated or non-activated, wherein the identifying if the expandable sand screen is activated or non-activated is performed with pattern matching.

Statement 12. The method of statements 1-3 or 9-11 further comprising: preparing a database linking an amplitude or a phase of a downhole log to an outer dimension of the expandable sand screen, wherein the downhole log changes linearly or quasi-linearly to indicate the expandable sand screen is activated, and wherein the database is composed of numerical simulations; and identifying if the expandable sand screen is activated or non-activated from the database.

Statement 13. A method for determining an activation of an expandable sand screen, comprising: disposing an electromagnetic (EM) detection tool into a wellbore, wherein the EM detection tool comprises: at least one transmitter; and at least one receiver; transmitting an EM field from the at least one transmitter into the expandable sand screen to energize the expandable sand screen and form an eddy current; recording a voltage of the eddy current with the at least one receiver; and determining an activation state of the expandable sand screen based at least partially on the voltage of the eddy current.

Statement 14. The method of statement 13, further comprising: obtaining a pre-activation log, wherein obtaining a pre-activation log is performed as the EM detection tool is lowered into the wellbore; obtaining a post-activation log, wherein obtaining a post-activation log is performed as the EM detection tool is logged up the wellbore; aligning the pre-activation log and the post-activation log; and comparing the pre-activation log and the post-activation log.

Statement 15. The method of statement 14, further comprising removing at least one noisy channel from the pre-activation log and the post-activation log and, optionally, chopping the pre-activation log and the post-activation log between a first collar and a second collar.

Statement 16. The method of statement 14, further comprising: finding a channel sensitive to the expandable sand screen that is activated or non-activated; determining a standard deviation of the pre-activation log and the post-activation log; and identifying if the expandable sand screen is activated or non-activated.

Statement 17. The method of statement 14, further comprising: finding a channel sensitive to the expandable sand screen that is activated or non-activated; determining a correlation coefficient between the pre-activation log and the post-activation log, wherein the correlation coefficient is computed between an amplitude or phase of the pre-activation log and the post-activation log; and identifying if the expandable sand screen is activated or non-activated.

Statement 18. The method of statement 14, further comprising: determining a variable density log (VDL) from the pre-activation log and the post-activation log; removing a baseline and normalizing the VDL; determining a 2D correlation coefficient, wherein the 2D correlation coefficient compares an image from the VDL of the pre-activation log and an image from the VDL of the post-activation log; and identifying if the expandable sand screen is activated or non-activated, wherein the identifying if the expandable sand screen is activated or non-activated is performed with pattern matching.

Statement 19. The method of statement 13 or 14 further comprising: preparing a database linking an amplitude or a phase of a downhole log to an outer dimension of the expandable sand screen, wherein the downhole log changes linearly or quasi-linearly to indicate the expandable sand screen is activated, and wherein the database is composed of numerical simulations; and identifying if the expandable sand screen is activated or non-activated from the database, wherein a fluctuating voltage indicates the expandable sand screen is non-activated, wherein a uniform voltage indicates the expandable sand screen is activated.

Statement 20. The method of statements 13, 14, or 19, wherein the at least one transmitter and the at least one receiver are coils.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for determining activation of an expandable sand screen, comprising:
    disposing an electromagnetic (EM) detection tool into a wellbore, wherein the EM detection tool comprises:
        at least one transmitter; and
        at least one receiver;
    transmitting an EM field from the at least one transmitter into the expandable sand screen to energize the expandable sand screen and form an eddy current flowing through the entire expandable sand screen;
    recording a voltage of the eddy current with the at least one receiver; and
    determining an activation state of the expandable sand screen based at least partially on the voltage of the eddy current.

2. The method of claim 1, wherein the at least one transmitter and the at least one receiver are coils.

3. The method of claim 1, further comprising:
    obtaining a pre-activation log;
    obtaining a post-activation log; and
    comparing the pre-activation log and the post-activation log.

4. The method of claim 3, wherein obtaining a pre-activation log is performed as the EM detection tool is lowered into the wellbore.

5. The method of claim 3, wherein obtaining a post-activation log is performed as the EM detection tool is logged up the wellbore.

6. The method of claim 3, further comprising aligning the pre-activation log and the post-activation log, removing at least one noisy channel from the pre-activation log and the post-activation log.

7. The method of claim 3, further comprising:
    finding a channel sensitive to the expandable sand screen that is activated or non-activated;
    determining a standard deviation of the pre-activation log and the post-activation log; and
    identifying if the expandable sand screen is activated or non-activated.

8. The method of claim 3, further comprising:
    finding a channel sensitive to the expandable sand screen that is activated or non-activated;
    determining a correlation coefficient between the pre-activation log and the post-activation log, wherein the correlation coefficient is computed between an amplitude or phase of the pre-activation log and the post-activation log; and
    identifying if the expandable sand screen is activated or non-activated.

9. The method of claim 1, wherein a fluctuating voltage indicates the expandable sand screen is non-activated.

10. The method of claim 1, wherein a uniform voltage indicates the expandable sand screen is activated.

11. The method of claim 3, further comprising:
    determining a variable density log (VDL) from the pre-activation log and the post-activation log, wherein determining the variable density log further comprises removing a baseline and normalizing the VDL;
determining a 2D correlation coefficient, wherein the 2D correlation coefficient compares an image from the VDL of the pre-activation log and an image from the VDL of the post-activation log; and
identifying if the expandable sand screen is activated or non-activated, wherein the identifying if the expandable sand screen is activated or non-activated is performed with pattern matching.

12. The method of claim 1 further comprising:
preparing a database linking an amplitude or a phase of a downhole log to an outer dimension of the expandable sand screen, wherein the downhole log changes linearly or quasi-linearly to indicate the expandable sand screen is activated, and wherein the database is composed of numerical simulations; and
identifying if the expandable sand screen is activated or non-activated from the database.

13. A system for determining an activation of an expandable sand screen, comprising:
an electromagnetic (EM) detection tool which comprises:
at least one transmitter, configured to transmit an EM field into the expandable sand screen to energize the expandable sand screen and form an eddy current flowing through the entire expandable sand screen;
at least one receiver configured to record a voltage of the eddy current; and
an information handling system configured to identify an activation state of the expandable sand screen based at least partially on the voltage of the eddy current.

14. The system of claim 13, wherein the information handling system is further configured to:
create a pre-activation log, which is created as the EM detection tool is lowered into the wellbore;
create a post-activation log, which is created as the EM detection tool is logged up the wellbore;
align the pre-activation log and the post-activation log; and
compare the pre-activation log and the post-activation log.

15. The system of claim 14, wherein the information handling system is further configured to remove at least one noisy channel from the pre-activation log and the post-activation log and chop the pre-activation log and the post-activation log between a first collar and a second collar.

16. The system of claim 14, wherein the information handling system is further configured to:
identify a channel sensitive to the expandable sand screen;
determine a standard deviation of the pre-activation log and the post-activation log; and
identify if the expandable sand screen is activated or non-activated.

17. The system of claim 14, wherein the information handling system is further configured to:
identify a channel sensitive to the expandable sand screen;
determine a correlation coefficient between the pre-activation log and the post-activation log, wherein the correlation coefficient is computed between an amplitude or phase of the pre-activation log and the post-activation log; and
identify if the expandable sand screen is activated or non-activated.

18. The system of claim 14, wherein the information handling system is further configured to:
determine a variable density log (VDL) from the pre-activation log and the post-activation log;
remove a baseline and normalize the VDL;
determine a 2D correlation coefficient, wherein the 2D correlation coefficient compares an image from the VDL of the pre-activation log and an image from the VDL of the post-activation log; and
identify if the expandable sand screen is activated or non-activated using pattern matching.

19. The system of claim 13, wherein the information handling system is further configured to:
Prepare a database linking an amplitude or a phase of a downhole log to an outer dimension of the expandable sand screen, wherein the downhole log changes linearly or quasi-linearly to indicate the expandable sand screen is activated, and wherein the database is composed of numerical simulations; and
identify if the expandable sand screen is activated or non-activated from the database, wherein a fluctuating voltage indicates the expandable sand screen is non-activated, and wherein a uniform voltage indicates the expandable sand screen is activated.

20. The system of claim 13, wherein the at least one transmitter and the at least one receiver are coils.

* * * * *